P. M. GUNDLACH.
Horse Rake.
No. 96,425.
2 Sheets—Sheet 1.
Patented Nov. 2, 1869.
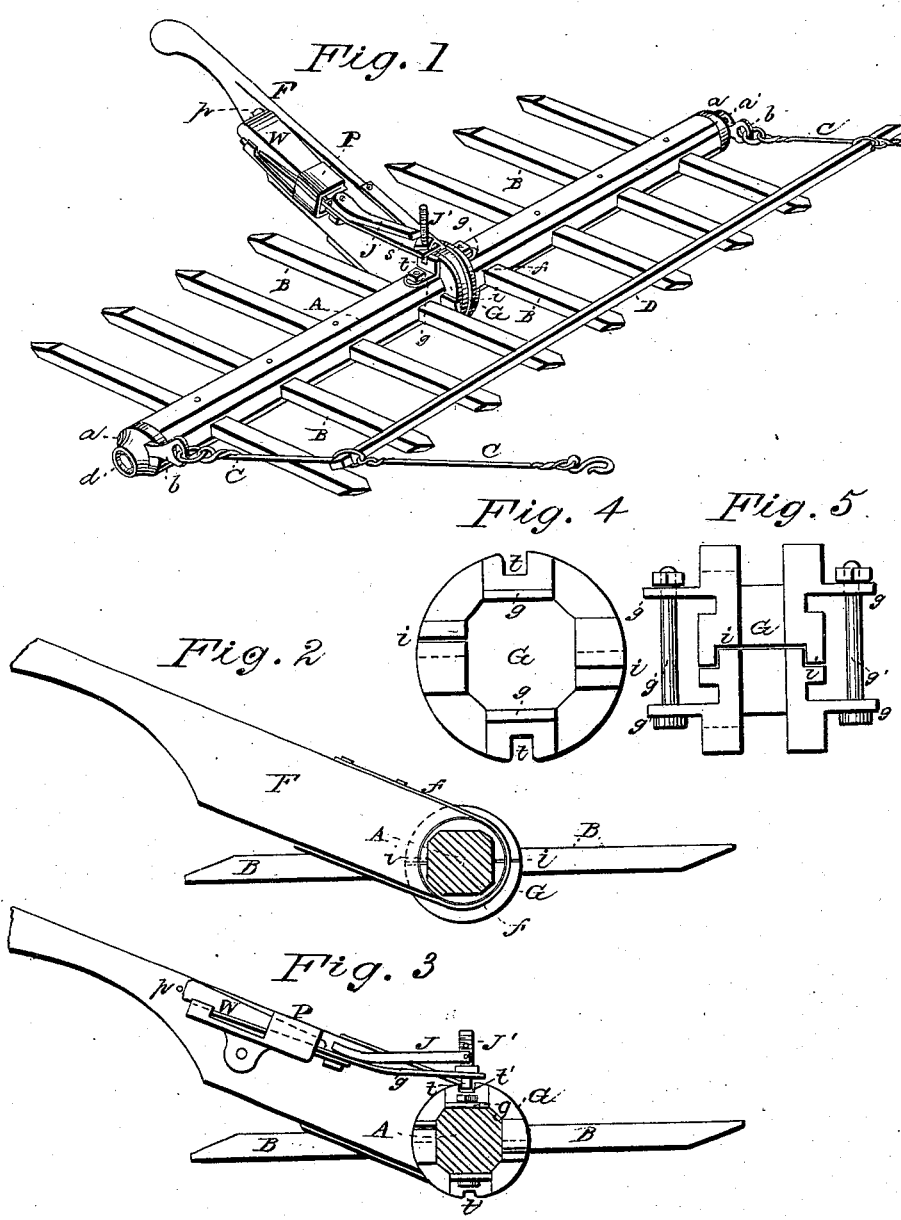

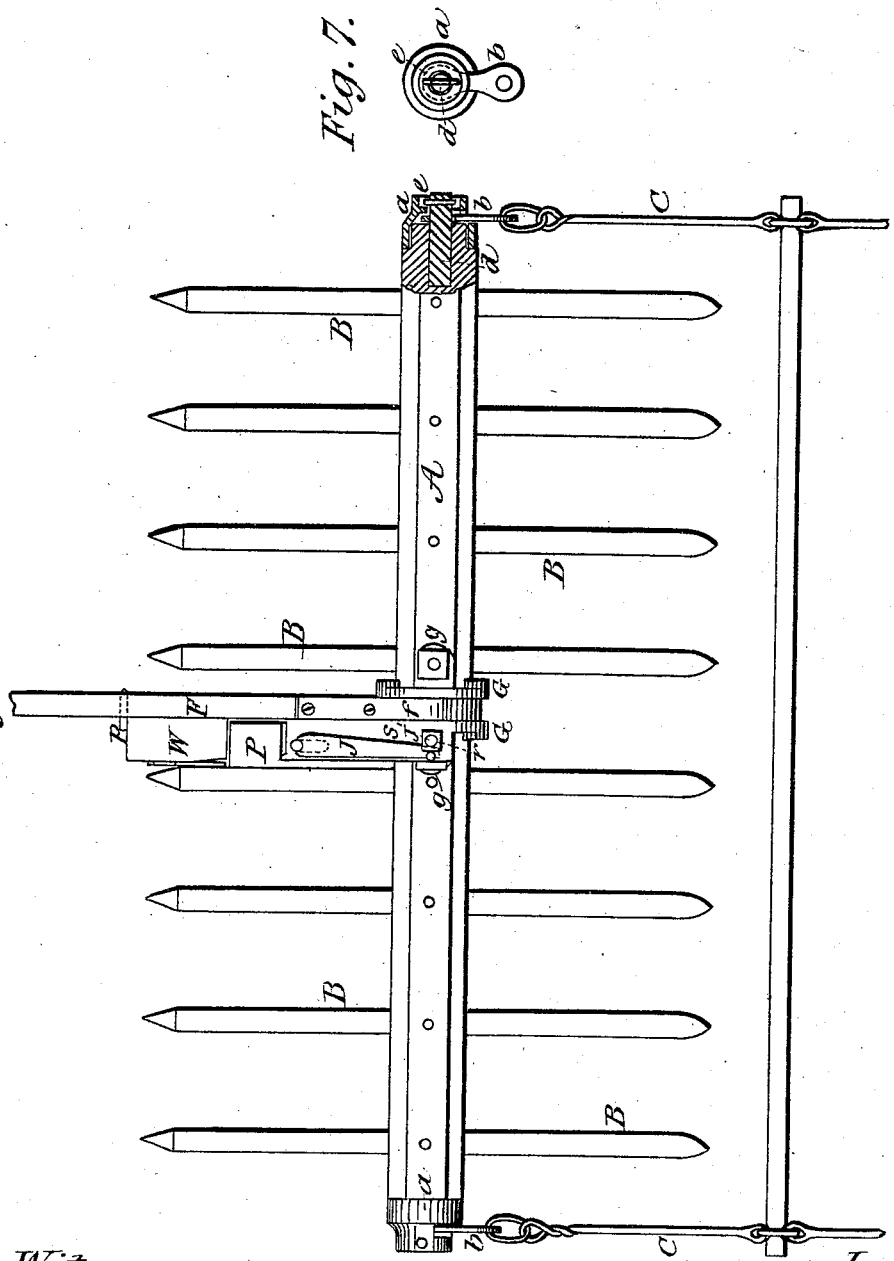

United States Patent Office.

PHILIP M. GUNDLACH, OF BELLEVILLE, ILLINOIS.

Letters Patent No. 96,425, dated November 2, 1869.

IMPROVEMENT IN HORSE HAY-RAKES.

The Schedule referred to in these Letters Patent and making part of the same.

*To all whom it may concern:*

Be it known that I, PHILIP M. GUNDLACH, of Belleville, in the county of St. Clair, and State of Illinois, have invented a new and improved Revolving Hay-Rake; and I do hereby declare that the following is a full, clear, and exact description thereof, reference being had to the accompanying drawings, making part of this specification, in which—

Figure 1, plate 1, is a perspective view of the improved rake complete.

Figure 2, plate 1, is a section through the rake-head, and through the flanged collar, to which the handle is applied.

Figure 3, plate 1, is a section taken through the rake-head on one side of the flanged collar.

Figures 4 and 5, plate 1, are enlarged views of the flanged collar.

Figure 6, plate 2, is a top view of the rake.

Figure 7, plate 2, is an end view of one of the thimbles which are applied to the rake-head.

Similar letters of reference indicate corresponding parts in the several figures.

This invention relates to certain novel improvements which are applicable to revolving hay-rakes of that class which are not mounted upon wheels, and which have tines extending from opposite sides of a turning head.

The nature of my invention consists—

First, in applying caps or thimbles upon the extremities of the rake-head, in such manner that grass will be prevented from entangling with or winding around the head at those points where the draught-chains are attached to it, as will be hereinafter explained.

Second, in a novel combination of an adjustable tooth-carrying spring with the rake-handle and the grooved collar, all as and for the purpose hereinafter described.

To enable others skilled in the art to understand my invention, I will describe its construction and operation.

In the accompanying drawings—

A represents the rake-head, through which the teeth B are passed, and to which these teeth are rigidly secured.

Into the ends of the head A, cylindrical pins $d$ are driven, and suitably secured; and upon the protruding portions of these pins $d$, circular thimbles $a$ and eye-pieces $b$ are slipped, and kept in place by means of linchpins $e$, passed through the ends of the pins $d$, outside of the closed ends of the thimbles $a$, as shown clearly in figs. 6 and 7, plate 2.

The enlarged portions of the thimbles are fitted loosely over the ends of the head A, so as to cap or cover these ends, and prevent grass from winding around them.

The eye-pieces $b$ are short metal plates, having holes through both ends. These pieces are inserted through slots made through the thimbles, previous to applying the thimbles upon the rake-head, so that, in the act of slipping the thimbles on the ends of the rake-head and pins $d$, the latter will receive the eye-pieces $b$, and form the connections.

It will be seen, by reference to fig. 6, that I construct the thimbles $a$ with partitions in them, through the centres of which holes are made, for receiving the pins $d$ through them.

Between these partitions and the ends of the rake-head A, the eye-pieces are connected to the pins $d$, so that grass is effectually excluded from the eye-pieces at their points of connection with the pins $d$.

Those ends of the eye-pieces $b$ which protrude through the thimbles have links C connected to them by shackles, which links are somewhat longer than the rake-teeth B, and are connected together by a bar, D.

The bar D and its links C C constitute a flexible draught-frame, to which the horses, for drawing the rake, are hitched, and through which the draught is applied to the pin $d$.

This frame D C C will allow the rake-head to be turned, for discharging loads, without interfering with the teeth, by reason of the bar D keeping the long links C C out of range of the teeth nearest the extremities of the rake-head.

The thimbles $a$ $a$ completely enclose the extremities of the rake-head, and also those eyes of the eye-pieces $b$ $b$ through which the journal-pins $d$ $d$ pass. Consequently, grass will not be liable to wind around, nor clog the rake-head at its points of connection to the draught-links.

The handle F, by which the attendant controls the movements of the rake, is connected to the rake-head at or near the middle of its length, by means of a strap, $f$, which embraces loosely an annular grooved portion of a collar, G, as shown in figs. 1 and 2.

This collar G is constructed of two semicircular parts or halves, with lugs $g$ $g$ formed upon them; and, when fitted together, as shown in the drawings, their abutting edges lap at $i$ $i$.

By means of the bolts $g'$ $g'$, which pass through the lugs $g$ $g$, and through the rake-head, the two halves of the collar are rigidly secured to the rake-head.

By removing the said bolts, the collar can be taken off the rake-head without removing a single rake-tooth.

One of the annular flanges of the collar G has notches, $t'$ $t'$, made into its periphery, diametrically opposite each other, which notches are adapted for receiving a tooth or latch, $t$, which is upon a spring, $s$.

The tooth $t$ is formed on one end of a screw, J', which is passed up through the free end of spring $s$, and secured, by a nut, on top of this spring.

The screw is braced, so as to resist the strains upon its tooth $t$, by means of an adjustable hooked brace, J, and the hooked portion $r$, which passes through one of several holes made through the screw J'.

The spring $s$ is confined rigidly to one side of the handle F by means of a wedge, W, and box P, and the wedge is held in its place by a removable pin, $p$, which is inserted through the handle at the rear end of this wedge.

By loosening the wedge W, and adjusting the brace J, the handle F can be inclined more or less; then, by tightening the wedge again, the handle will retain the adjusted position.

By depressing the rear end of the handle F, the tooth $t$ and the rake-head, with its teeth, can be turned, so as to discharge a load, and bring the opposite set of teeth into position for operation, in which position the rake-head and teeth will be held by the tooth $t$ engaging with the collar G again.

Having described my invention,

What I claim as new, and desire to secure by Letters Patent, is—

1. The thimbles $a$, constructed and applied to the rake-head, and having combined with them the draught eye-pieces $b$, substantially as described.

2. The adjustable tooth-carrying spring $s$, brace J, screw J', rake-handle F, and grooved collar G, constructed and operating substantially as described.

PHILIP M. GUNDLACH.

Witnesses:
PHILIPP SCHUCK,
HENRY WEBER.